United States Patent
Chen et al.

(10) Patent No.: US 9,225,171 B2
(45) Date of Patent: Dec. 29, 2015

(54) INTELLIGENT ELECTRIC VEHICLE RECHARGING

(75) Inventors: Wei-Peng Chen, Fremont, CA (US); Mostafa Majidpour, Los Angeles, CA (US)

(73) Assignee: Fujitsu Limited, Kawasaki-shi (JP)

( * ) Notice: Subject to any disclaimer, the term of this patent is extended or adjusted under 35 U.S.C. 154(b) by 832 days.

(21) Appl. No.: 13/436,608

(22) Filed: Mar. 30, 2012

(65) Prior Publication Data

US 2013/0257372 A1     Oct. 3, 2013

(51) Int. Cl.
| | |
|---|---|
| H02J 7/00 | (2006.01) |
| H02J 3/14 | (2006.01) |
| H02J 3/38 | (2006.01) |
| H02J 13/00 | (2006.01) |
| B60L 11/18 | (2006.01) |

(52) U.S. Cl.
CPC ............ *H02J 3/14* (2013.01); *B60L 11/184* (2013.01); *B60L 11/1816* (2013.01); *B60L 11/1844* (2013.01); *B60L 11/1846* (2013.01); *B60L 11/1848* (2013.01); *H02J 3/38* (2013.01); *H02J 3/383* (2013.01); *H02J 3/386* (2013.01); *H02J 7/0013* (2013.01); *H02J 13/0006* (2013.01); *B60L 2230/40* (2013.01); *B60L 2240/70* (2013.01); *Y02E 10/563* (2013.01); *Y02E 10/763* (2013.01); *Y02E 60/721* (2013.01); *Y02T 10/7005* (2013.01); *Y02T 10/7055* (2013.01); *Y02T 10/7088* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
USPC ................................................. 320/104, 109
See application file for complete search history.

(56) References Cited

U.S. PATENT DOCUMENTS

| | | | | |
|---|---|---|---|---|
| 2010/0017249 | A1* | 1/2010 | Fincham et al. | 705/8 |
| 2010/0174667 | A1* | 7/2010 | Vitale et al. | 705/412 |
| 2010/0211643 | A1* | 8/2010 | Lowenthal et al. | 709/206 |
| 2012/0274268 | A1* | 11/2012 | Ishida | 320/107 |

OTHER PUBLICATIONS

Clement, K., et al., "Coordinated charging of multiple plug-in hybrid electric vehicles in residential distribution grids", Proc. IEEE Power Syst. Conf. and Exposition, pp. 1-7, Apr. 2009.

Clement-Nyns, K., et al., "The Impact of Charging Plug-In Hybrid Electric Vehicles on a Residential Distribution Grid," IEEE Trans. Power Syst., vol. 25, No. 1, pp. 371-380, Feb. 2010.

Deilami, S., et al., "Real-Time Coordination of Plug-In Electric Vehicle Charging in Smart Grids to Minimize Power Losses and Improve Voltage Profile," IEEE Trans. Smart Grid, vol. 2, No. 3, pp. 456-467, Sep. 2011.

(Continued)

*Primary Examiner* — Samuel Berhanu
(74) *Attorney, Agent, or Firm* — Baker Botts L.L.P.

(57) ABSTRACT

Some embodiments determine, for electric vehicles within an electricity distribution network, optimal recharging schedules based on customer requirements. Some embodiments adjust the optimal recharging schedules to ensure that components of the electricity distribution network operate within their rated limits based on a node sensitivity approach.

17 Claims, 4 Drawing Sheets

(56) References Cited

OTHER PUBLICATIONS

Farmer, C., et al., "Modeling the Impact of Increasing PHEV Loads on the Distribution Infrastructure," 43rd Hawaii International Conference on System Sciences (HICSS), pp. 1-10, Jan. 2010.

Gan, L., et al., "Optimal Decentralized Protocol for Electric Vehicle Charging," [Online]. Available: http://www.cds.caltech.edu/~utopcu/ images/9/96/GTL-cdcll.pdf.

Green II, R. C., et al., "The impact of plug-in hybrid electric vehicles on distribution networks: A review and outlook," Renewable and Sustainable Energy Reviews, Elsevier, vol. 15, No. 1, pp. 544-553, Jan. 2011.

Hurst, D., et al., "Electric Vehicle Market Forecasts," Pike Research, https://www.pikeresearch.com/wordpress/wp-content/uploads/2011/08/EVMF-11-Executive-Summary.pdf, 2011.

Kundur, P., et. al., "Definition and Classification of Power System Stability," IEEE Transactions on Power Systems, Aug. 2004.

Ma, Z., et al., "Decentralized charging control for large populations of plug-in electric vehicles: Application of the Nash certainty equivalence principle", Proc. IEEE Conf. Control Applications (CCA), Yokohama, MN, pp. 191-195, Sep. 2010.

Mets, K., et al., "Optimizing Smart Energy Control Strategies for Plug-In Hybrid Electric Vehicle Charging," Proc. IEEE/IFIP Network Operations and Management Symposium Workshops, pp. 293-299, Apr. 2010.

Putrus, G.A., et al., "Impact of electric vehicles on power distribution networks," Proc. IEEE Vehicle Power and Propulsion Conf., Dearborn, MI, pp. 827-831, Sep. 2009.

Richardson, P., et al., "Impact assessment of varying penetrations of electric vehicle on low voltage distribution systems," Proc. IEEE Power and Energy Soc. General Meeting, Minneapolis, MN, pp. 1-6, Jul. 2010.

Richardson, P., et al., "Optimal Charging of Electric Vehicles in Low-Voltage Distribution Systems," IEEE Trans. Power Syst., vol. PP, No. 99, pp., Jun. 2011.

Schneider, K., et al., "Impact assessment of plug-in hybrid vehicles on pacific northwest distribution systems," Proc. IEEE Power and Energy Soc. General Meeting, Pittsburgh, PA, pp. 1-6, Jul. 2008.

Sortomme, E., et al., "Coordinated Charging of Plug-In Hybrid Electric Vehicles to Minimize Distribution System Losses," IEEE Trans. Smart Grid, vol. 2, No. 1, pp. 198-205, Mar. 2011.

St. John, J., "PG&E's Smart Grid Challenges and Solutions by the Region," GreenTechMedia.com, Nov. 4, 2009, http://www.greentechmedia.com/articles/read/pges-smart-grid-challenges-and-solutions-by-the-region/.

Taylor, J., et al., "Evaluation of the impact of plug-in electric vehicle loading on distribution system operations," *Proc. IEEE Power and Energy Soc. General Meeting*, Calgary, AB, Canada, pp. 1-6, 2009.

Vandael, S., et al., "Decentralized demand side management of plug-in hybrid vehicles in a Smart Grid," Proc. 1st Intl. Workshop on Agent Technologies for Energy Systems (ATES 2010), pp. 67-74, May 2010.

\* cited by examiner

INTELLIGENT ELECTRIC VEHICLE RECHARGING

TECHNICAL FIELD

This disclosure generally relates to electric vehicles.

BACKGROUND

Electricity generated at power plants is transmitted by high-voltage transmission lines to electrical substations, then is delivered to end customers through electricity distribution networks. The high-voltage transmission lines are often interconnected with each other, forming electricity transmission networks (often referred as "power grids"). The electrical substations at the edge of the power grids transform electricity (from the power grids) from high voltages (e.g., 110 kV or higher) to intermediate voltages (e.g., 50 kV or less). The electricity distribution networks, including additional electrical substations, transformers, power lines, and meters, deliver electricity to end customers at lower voltage for consumption (e.g., 110 V and 220 V for North American households).

Electric vehicles can store electrical energy in batteries and use one or more electric motors for propulsion. An electric vehicle such as Nissan Leaf and plug-in hybrid electric vehicle (PHEV) such as Toyota Prius Plug-in Hybrid can recharge the batteries by connecting an on-car charger to a standard household power outlet, or by connecting to a special-purpose charging equipment installed at households or at public-accessible locations (e.g., parking garage, curb side, etc.). Examples of special-purpose charging equipment are Electric Vehicle Supply Equipment (EVSE) and charging stations.

SUMMARY

Particular embodiments relate to determining optimal recharging schedules for electric vehicles within an electricity distribution network, based on customer requirements, and adjusting the optimal recharging schedules to ensure that components of the electricity distribution network operate within their rated limits based on a node sensitivity approach.

The object and advantages of the invention will be realized and attained at least by the elements, features, and combinations particularly pointed out in the claims. It is to be understood that both the foregoing general description and the following detailed description are exemplary and explanatory and are not restrictive of the invention, as claimed.

DESCRIPTION OF EXAMPLE EMBODIMENTS

Figure 1:
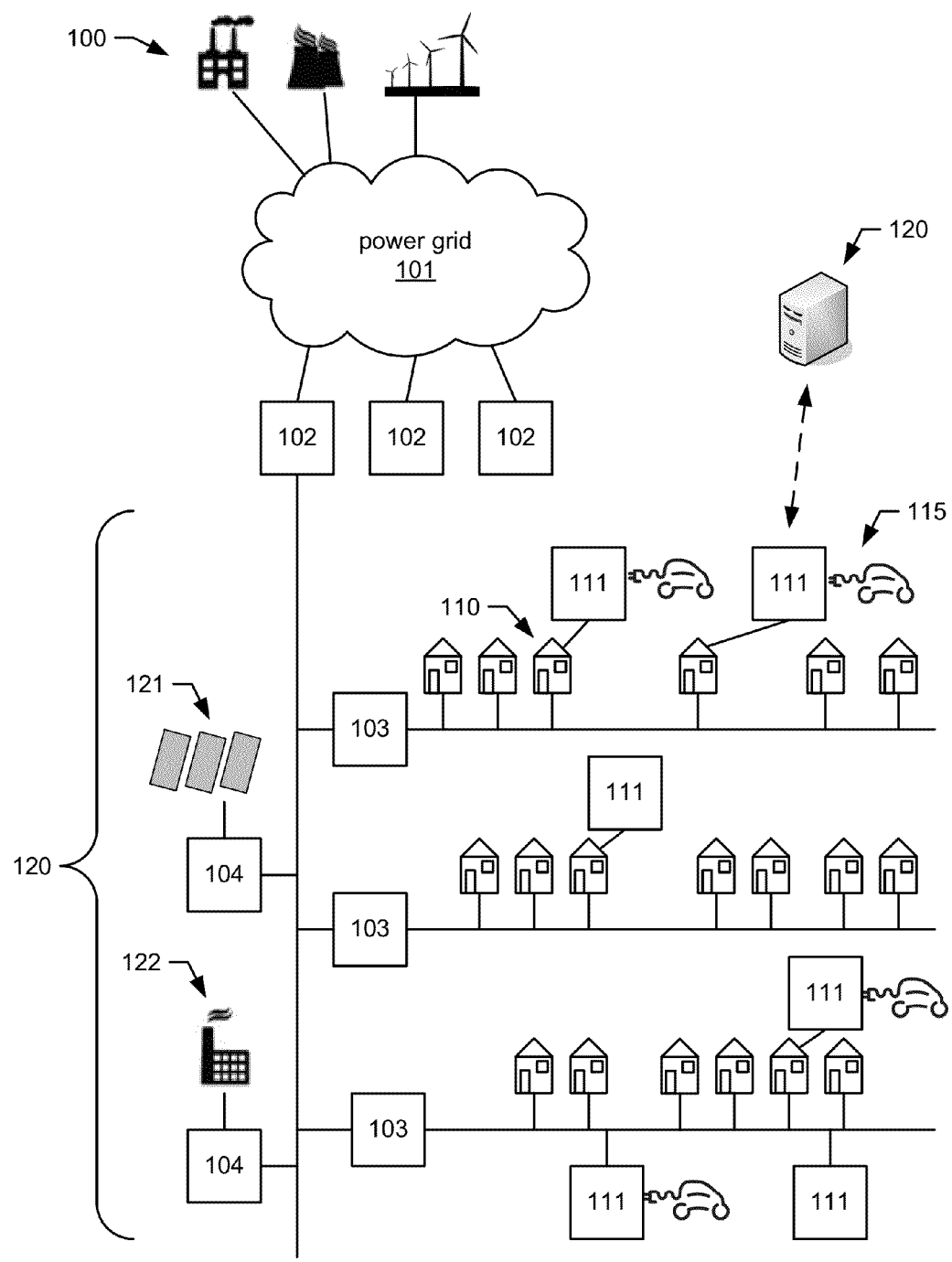
FIG. 1 illustrates an example electricity delivery system.

FIG. 1 illustrates an example electricity delivery system. In the example of FIG. 1, electricity generated at power plants 100 (e.g., coal-fueled power plant, nuclear power plant, hydroelectric power plant, wind farm, solar farm, etc.) is transmitted by power grid 101 to electrical substations 102. Power grid 101 may comprise networks of high-voltage (e.g., 110 kV or higher) transmission lines. Electricity is often transmitted at high voltages to reduce energy loss for long-distance transmission. An electrical substation may convert electricity from a higher voltage to a lower voltage (or vice versa). An electrical substation may also perform switching functions that connect or disconnect a portion of the electricity delivery system to and from another portion of the electricity delivery system. An electrical substation may comprise components, such as transformers, switches, and protection and control component.

An electrical substation 102 at the edge of power grid 101 may transform electricity from power grid 101 from a high voltage (e.g., 110 kV or higher) to an intermediate voltage (e.g., 50 kV or less), and deliver electricity to end customers through an electricity distribution network 120. Electricity distribution network 120 may include one or more electrical substations or transformers 103, power lines, and meters that deliver electricity to end customers at suitable voltages. For example, electricity distribution network 120 may deliver electricity to households 110 at 110 or 220 Volts. Note that there may be multiple electrical substations and transformers between an electrical substation 102 at the edge of power grid 101 and a household 110. Those electrical substations and transformers convert electricity from the intermediate voltage to a voltage consumable at a household in multiple stages. Electricity distribution network 120 may include customers other than households, such as office buildings and industrial plants.

Electric vehicles 115 may recharge their batteries by connecting to electricity distribution network 120 through charging equipment 111. For example, charging equipment 111 may be an on-car charger that is connected to a standard household power outlet. As another example, charging equipment 111 may be a special-purpose charging equipment installed at households or at publicly-accessible locations (e.g., parking garage, curb side, etc.).

Electricity distribution network 120 may further include electricity power sources, such as solar panels 121 and local power generator 122, as illustrated in FIG. 1. This disclosure contemplates any suitable electricity power source of an electricity distribution network. One or more substations or transformers 104 may convert electricity from voltages at the power sources to a voltage corresponding to the main power lines of electricity distribution network 120.

Electricity distribution network 120 in FIG. 1 illustrates a radial network branching out from an electrical substation 102. However, this disclosure contemplates any suitable topologies of an electricity distribution network. For example, an electricity distribution network may include two or more different distribution networks, each branching out from a different electrical substation 102 at the edge of power grid 101, while the different distribution networks are connected to each other through one or more secondary networks. For example, an electricity distribution network may include an intermediate electrical substation (e.g., 103) and components and loads downstream from the intermediate electrical substation (e.g., loads and components of a neighborhood served by the intermediate electrical substation).

Power grids and electricity distribution networks often use a three-phase system for delivering alternating current (AC) electrical power. As the three-phase currents tend to cancel out one another, the three-phase system may create a balanced load for electrical power transferring, while simplifying the design of transmission lines and other electrical components.

Recharging electric vehicles may create significant load on an electricity delivery system. For example, the Nissan Leaf may draw up to 3.3 kW of electrical power during recharging, which is significantly higher than the average electricity load per household (about 1.33 kW in the United States in 2010). A concentration of electric vehicles in a neighborhood may put further strain on an electricity distribution network serving the neighborhood. For example, the additional load from recharging electric vehicles may cause power lines and transformers in an electricity distribution network to exceed their rated limits. For example, additional load from recharging electric vehicles may cause voltage variations at nodes of an electricity distribution network that exceed their rated limits. For example, additional load from recharging electric vehicles may cause phase imbalance between different nodes within an electricity distribution network (or phase imbalance between two or more electricity distribution networks). For example, simultaneous recharging multiple electric vehicles may cause peak electricity demand to exceed rated capacities of an electricity distribution network. Updating electricity generation capacity and the delivery system may alleviate problems caused by electric vehicle recharging. However, this can be very expensive. Constraining recharging all electric vehicles may alleviate strains put on an electricity delivery system. However, this may thwart the requirements of owners of electric vehicles (e.g., completion of recharging within a period of time specified by an owner).

Particular embodiments describe methods of optimizing electric vehicle recharging within an electricity distribution network. Particular embodiments use a power system to represent an electricity distribution network to simulate loads from electric vehicle recharging. Particular embodiments optimize electric vehicle recharging by determining optimal solutions or states of the power system.

In particular embodiments, a power system may represent an electricity distribution network. In particular embodiments, the power system may comprise interconnecting components representing loads (e.g., households 110 illustrated in FIG. 1), power sources (e.g., solar panels 121 and local power generator 122 illustrated in FIG. 1), substations, switches, transformers (e.g., 103 and 104 illustrated in FIG. 1), and power lines connecting other components. Within this disclosure, connection points in the power system may be referred to as nodes. A load bus or a PQ bus is a node without any power sources connected. A generator bus or a PV bus is a node with at least one power source connected thereto. The power system may further include a slack bus node for ease of computation. An example power system is the Institute of Electrical and Electronics Engineers (IEEE) 8500-node Test Feeder developed by R. F. Arritt and R. C. Dugan affiliated with Electric Power Research Institute.

Particular embodiments may optimize electric vehicle recharging within the power system by optimizing the total demand of the power system. Here, total demand at a particular time step t of the power system may be defined as:

$$TotalDemand(t) = H(t) + \sum_{i=1}^{N_{EV}} E_i(t)$$

wherein H(t) is the base demand profile (e.g., in kW) for all households of the power system at the particular time step t (without electric vehicle recharging). H(t) may be a measured number or a predicted number based on previous energy consumption. $E_i(t)$ is the charging load (e.g., in kW) at the i-th node while connecting to a recharging electric vehicle at the particular time step t. $N_{EV}$ is the total number of potential electric vehicles within the power system. Particular embodiments may optimize the total demand of the power system by minimizing the L-2 or Euclidean norm (denoted as $\|\ \|_2$) of the total demand over a pre-determined period of time T (e.g., 24 hours) for all $N_{EV}$ electric vehicles:

$$\min_{\vec{E}} \|TotalDemand(.)_2\| = \min_{\vec{E}} \sum_{t=1}^{T} [TotalDemand(t)]^2$$

$$= \min_{\vec{E}} \sum_{t=1}^{T} \left[ H(t) + \sum_{i=1}^{N_{EV}} E_i(t) \right]^2$$

wherein $1 < t < T$. $\vec{E} = \{E_1(\bullet), E_2(\bullet), \ldots, E_{N_{EV}}(\bullet)\}$ is the set of charging loads for all electric vehicles for $1 \le t \le T$. The L-2 norm of the total demand (the summation over T of the square of the total demand at each time step t) may represent the total operation cost for the electricity distribution network. Since the marginal price of electricity generation may be simplified to a linear function of the demand, the total cost of the aggregated demand is an integration of the multiplication of the demand, which may be simplified as the square of the demand.

The optimization of the total demand (e.g., optimized by minimizing the L-2 norm of the total demand) may be based on consumer demand. For example, the optimization of the total demand may be subject to customer recharging schedules of the $N_{EV}$ electric vehicles within the power system. More particularly, the optimization of the total demand is subject to a customer recharging schedule at each i-th node connecting to an electric vehicle, as defined by the time $TP_i$ when the electric vehicle is plugged in to the power system at the i-th node, and the time $TUP_i$ when the electric vehicle is unplugged from the power system at the i-th node. The energy $C_i$ (e.g., in kWh) required to charge the electric vehicle at the i-th node is:

$$\sum_{t=TPi}^{TUPi} E_i(t) \cdot \Delta T = B_i[1 - SOC_i(TPi)] = C_i,$$

for $$1 \le i \le N_{EV}$$

wherein $\Delta T$ is the duration of a time step, $B_i$ is the absolute battery capacity (e.g., in kWh) for the electric vehicle connecting at the i-th node, and $SOC_i(TP_i)$ (e.g., in percentage) is the state of charge (SOC) of the electric vehicle's battery at the plug-in time $TP_i$. In one embodiment, the customer at the i-th node may require the battery to be charged to a level less than the absolute battery capacity $B_i$, wherein $SOC_i(TUP_i)$ may be defined by the customer instead of defaulting to 1. By optimizing the total demand based on customer recharging schedules, particular embodiments may determine, for each i-th node connecting to an electric vehicle, an optimal recharging schedule $E_i(t)$, $1 \le t \le T$, at the i-th node.

Minimization of the L-2 norm of the total demand with respect to customer recharging schedules of the electric vehicles within the power system may be solved with quadratic programming algorithms (e.g., based on augmented Lagrangian method, conjugate gradient method, etc.). Quadratic programming algorithms may be implemented with software such as Matlab by MathWorks, Inc. This disclosure contemplates any suitable methods and algorithms for minimizing the L-2 norm of the total demand with respect to customer recharging schedules of the electric vehicles within the power system.

Optimization of the total demand of the power system may be subject to customer requirements, such as the customer recharging schedules described above. Meanwhile, optimization of the total demand (e.g., by minimizing the L-2 norm of the total demand) may be subject to system constraints of the power system. More particularly, optimization of the total demand may be subject to the following system constraints at buses of the power system:

$$\theta_j^{min} \leq \theta_j(t) \leq \theta_j^{max}, \text{ for } 1 \leq j \leq N_B, \text{ for all } t;$$

$$P_j(t) = P_{j0}, \text{ for } 1 \leq j \leq N_B, \text{ for all } t;$$

$$V_j^{min} \leq V_j(t) \leq V_j^{max}, \text{ for } j \in PQ, \text{ for all } t;$$

$$Q_j(t) = Q_{j0}, \text{ for } j \in PQ, \text{ for all } t;$$

$$Q_j^{min} \leq Q_j(t) \leq Q_j^{max}, \text{ for } j \in PV, \text{ for all } t;$$

$$V_j(t) = V_{j0}, \text{ for } j \in PV, \text{ for all } t;$$

wherein $N_B$ is the number of buses in the power system. PQ is a set of PQ buses, and PV is a set of PV buses. $V_j(t)$ is the voltage magnitude at bus j at time t. $\theta_j(t)$ is the voltage angle (phase) at bus j at time t. $P_j(t)$ is the real power at bus j at time t. $Q_j(t)$ is the reactive power at bus j at time t.

Additionally, optimization of the total demand may be subject to system constraints at components of the power system:

$$|I_k(t)| \leq |I_k^{max}|, \text{ for } 1 \leq k \leq N_Q, \text{ for all } t$$

wherein $N_Q$ is the number of components (e.g., power lines, transformers, switches, etc.) of the power system. $|I_k(t)|$ is the absolute current flowing through component k at time t.

That is, optimization of the total demand may be subject to system constraints at the PQ buses where the real power |P| and the reactive power |Q| are specified, and their voltage ranges should be within a normal range. Optimization of the total demand may also be subject to system constraints at PV buses where the real power |P| and the voltage magnitude |V| are specified, and their reactive power should be kept within a normal range. Meanwhile, optimization of the total demand may be subject to system constraints at components such that the components (e.g., power lines, transformers, switches, etc.) should be operated within the maximum-rated capacity (e.g., maximum-allowable current level). In some embodiments, omission of any system constraint in this calculation may cause system instability.

With system constraints, optimizing total demand for electric vehicle recharging within the power system can be challenging, since most of the components in the power system have non-linear behavior. That is, the optimization of the total demand can become a non-convex (and non-converging) numerical problem. Particular embodiments describe methods of optimizing electric vehicle recharging based on a node sensitivity approach. Particular embodiments may determine sensitivity coefficients of the power system with respect to potential electric vehicle-connecting nodes. Particular embodiments may determine optimal recharging schedules for electric vehicles within the power system based on the sensitivity coefficients.

Figure 2:
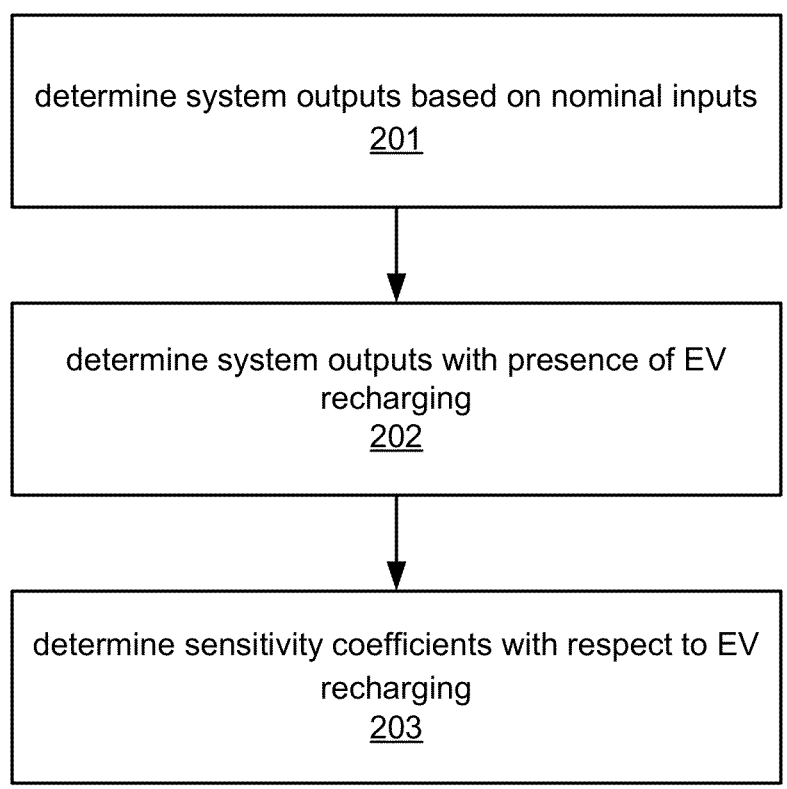
FIG. 2 illustrates an example method for determining sensitivity coefficients of a power system.

FIG. 2 illustrates an example method for determining sensitivity coefficients of the power system. The example method of FIG. 2 may determine sensitivity of the power system (e.g., voltages or currents at bus nodes and components) caused by each potential electric vehicle-connecting node. The example method of FIG. 2 may be implemented by an application hosted by one or more computing devices. First, particular embodiments may determine system outputs based on nominal inputs (at 201). For example, particular embodiments may determine voltages or currents at bus nodes and components of the power system based on the base demand profile H(t) described earlier. That is, particular embodiments may determine voltages or currents at the bus nodes and components in absence of electric vehicle recharging.

Secondly, particular embodiments may determine system outputs with presence of electric vehicle recharging (at 202). Specifically, particular embodiments may determine system outputs in response to recharging each individual electric vehicle. For example, for each i-th node connecting to a recharging electric vehicle, particular embodiments may determine voltages or currents at bus nodes and components of the power system based on the base demand profile and the charging load of the electric vehicle at the i-th node: $H(t)+E_i(t)$.

Next, particular embodiments may determine sensitivity coefficients with respect to electric vehicle recharging (at 203). For example, for the m-th bus node or component, particular embodiments may calculate the change $\Delta Output_{im}$ in voltage or current with and without the presence of a recharging electric vehicle at the i-th node. Particular embodiments may also calculate the change $\Delta Input_i$ in load at the i-th node with and without the presence of a recharging electric vehicle (e.g., $E_i(t)$). Particular embodiments may determine a sensitivity coefficient $\alpha_{im}$ for the m-th bus node or component in response to electric vehicle recharging at the i-th node by calculating the ratio between the change in voltage or current at the m-th bus node or component and the change in load at the i-th node:

$$\alpha_{im} = \Delta Output_{im} / \Delta Input$$

In some embodiments, the sensitivity coefficient $\alpha_{im}$ may be of a static value (i.e., calculated once). In other embodiments, the sensitivity coefficient $\alpha_{im}$ may be measured periodically or on demand in response to variation of the base load.

The determining of the power system's outputs based on a set of inputs may be implemented using power flow analysis algorithms. An example software for power flow analysis algorithms is Open Distribution Simulator Software (OpenDSS) developed by Electric Power Research Institute, Inc. In one embodiment, the determining of the power system's inputs and outputs may be based on a benchmark measurement. For example, the utility company may instruct one EV recharging within the power system at a given time, and measure the power system's outputs and corresponding inputs. This disclosure contemplates any suitable methods and algorithms in determining a power system's outputs based on a set of inputs. Particular embodiments may repeat the operations of the method of FIG. 2, where appropriate. Moreover, although this disclosure describes and illustrates particular operations of the method of FIG. 2 as occurring in a particular order, this disclosure contemplates any suitable operations of the method of FIG. 2 occurring in any suitable order. Furthermore, although this disclosure describes and illustrates particular components, devices, or systems carrying out particular steps of the method of FIG. 2, this disclosure contemplates any suitable combination of any suitable components, devices, or systems carrying out any suitable steps of the method of FIG. 2.

Figure 3:
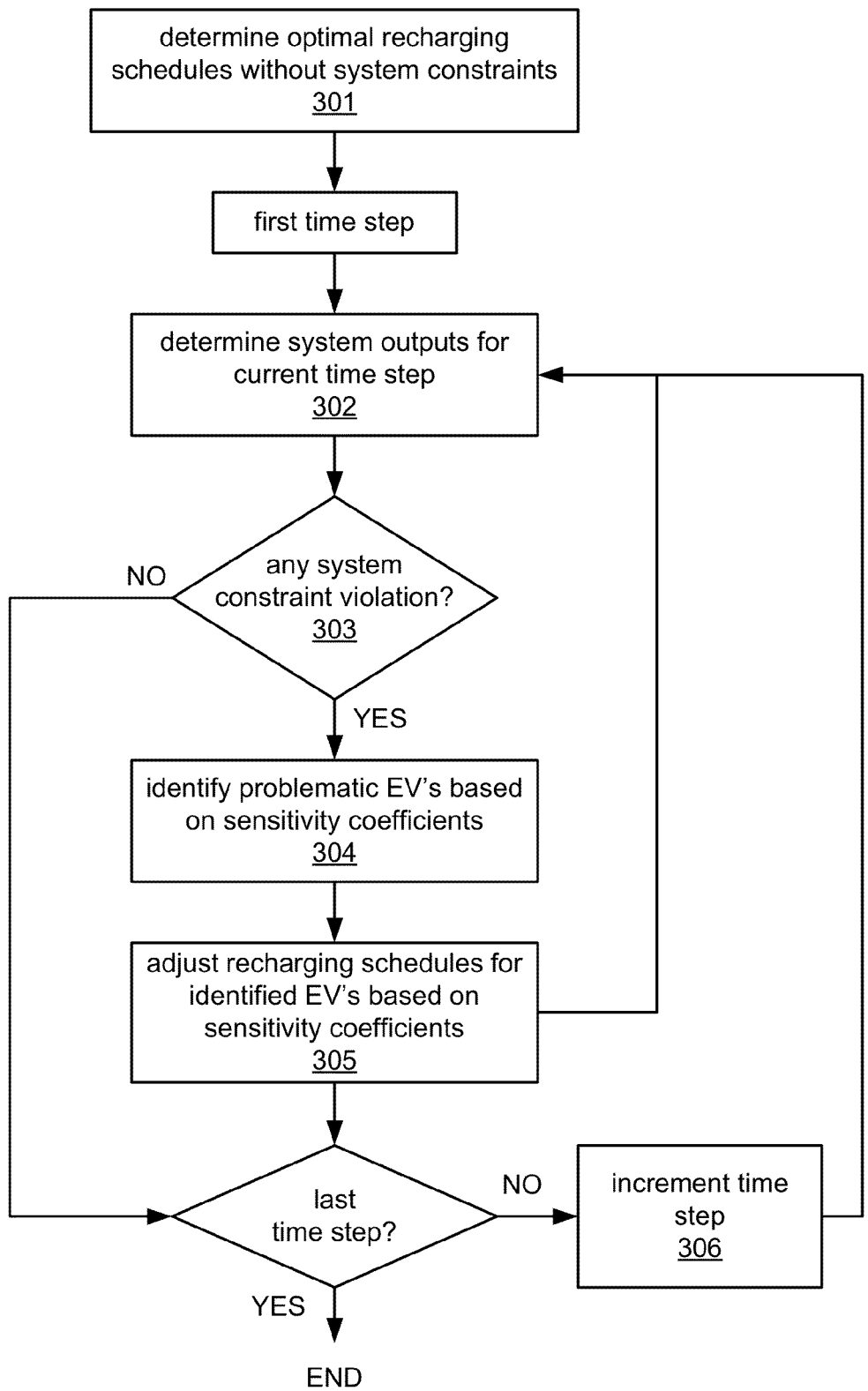
FIG. 3 illustrates an example method for determine optimal recharging schedules for electric vehicles within the power system based on sensitivity coefficients.

FIG. 3 illustrates an example method of determining optimal recharging schedules for electric vehicles within the power system based on sensitivity coefficients. The example method of FIG. 3 may be implemented by one or more computing devices (e.g., server 120 or an application hosted by server 120) and/or by charging equipment 111 illustrated in FIG. 1. Server 120 may be operated by a utility company owning electricity distribution network 120 or by a third-party entity. Server 120 may be located in a location within or remote to electricity distribution network 120. Charging equipment 111 may be on-car chargers or special-purpose charging equipment as described earlier. In particular embodiments, each charging equipment 111 may communicate with server 120 via the Internet, a wired or wireless local area network (LAN), a cellular network, a wide area network (WAN), a power line communication network, or a combination of two or more such networks. A charging equipment 111 may include a microcontroller (or any suitable computer system 800 illustrated in FIG. 4) that monitors and controls charging circuits of the charging equipment 111, while communicating with server 120 via one or more communication interfaces of the charging equipment 111.

In particular embodiments, server 120 may determine optimal recharging schedules for electric vehicles within the power system without system constraints over a pre-determined period of time T (at 301). For example, server 120 may determine optimal recharging schedules by optimizing the total demand of the power system based on customer recharging schedules (defined by the plug-in time $TP_i$ and the unplug time $TUP_i$ for each i-th node connecting to an electric vehicle) described earlier.

Server 120 may determine customer recharging schedules (e.g., plug-in and unplug times) for electric vehicle recharging based on indications from charging equipment 111. For example, a customer at an i-th node (e.g., a household) may program plug-in and unplug times for electric vehicle recharging into charging equipment 111 at the i-th node, causing charging equipment 111 to transmit to server 120 a message including the programmed plug-in and unplug times. In another example, charging equipment 111 at an i-th node may record plug-in and unplug times of electric vehicle recharging at the i-th node, and transmit to server 120 a message including the recorded plug-in and unplug times. Server 120 may store the plug-in and unplug times for electric vehicle recharging transmitted from charging equipment 111 for later use. In one embodiment, server 120 may assign default plug-in and unplug times for electric vehicle recharging (e.g., between 8 o'clock in the evening and 6 o'clock in the next morning). This disclosure contemplates any suitable methods in determining customer recharging schedules.

Starting from the first time step t, in particular embodiments, server 120 may determine system outputs for the current time step (at 302). Server 120 may determine system outputs for the current time step t, based on system input $H(t)+\vec{E}_i(t)$, using a suitable power flow analysis method as described earlier. In particular embodiments, server 120 may determine whether any system constraint violation exists (at 303). For example, server 120 may determine whether currents or voltages at any bus nodes or components are out of normal operation ranges. If there is no system constraint violation, the current optimal recharging schedule(s) at time step t is the optimal solution.

If there is no system constraint violation, server 120 may increment time step t (at 306). Server 120 may continue determining system outputs (at 302), and determining whether any system constraint violation exists for the next time step (at 303).

If there are one or more system constraint violations, in particular embodiments, server 120 may identify problematic recharging electric vehicles based on sensitivity coefficients (at 304). In particular embodiments, server 120 may calculate sensitivity coefficients based on the example method of FIG. 2. In some embodiments, for each system constraint violation for the m-th component, the charging loads for the i-th electric vehicles identified with the highest sensitivity coefficient $\alpha_{im}$ may be adjusted first. In other embodiments, the charging loads for all electric vehicles with positive sensitivity coefficients may be adjusted. This disclosure contemplates all suitable methods for identifying problematic recharging electric vehicles.

In particular embodiments, server 120 may adjust recharging schedules for identified electric vehicles based on the sensitivity coefficients. For example, assume that electric vehicle recharging at the i-th node is identified as causing a system constraint violation for the m-th component at a particular time step t. Server 120 may adjust the recharging schedule at the i-th node by adjusting charging load $E_i(t)$ at the i-th node at the particular time step t based on sensitivity coefficient $\alpha_{im}$ (as determined by the example method of FIG. 2):

$$E_i(t) \Leftarrow E_i(t) \times (1 - \beta \times \alpha_{im})$$

Here, $\beta$ is a parameter with a small value used to adjust charging load $E_i(t)$ in finer steps. In some embodiments, only positive $\alpha_{im}$ is used to adjust charging load $E_i(t)$ to guarantee convergence of the optimization. In some embodiments, if there are multiple system constraint violations, charging loads for electric vehicles identified with the most significant system constraint violations may be adjusted first.

After adjusting recharging schedules for identified electric vehicles at the current time step t, server 120 may determine system outputs for the current time step (at 302), and determine whether any system constraint violation exists (at 303). In some embodiments, if there are no system constraint violations, the adjusted recharging schedule is the optimal solution; in other embodiments, it may be the near-optimal solution. Server 120 may increment time step (at 306), determine system outputs (at 302), and determine whether any system constraint exists for the next time step (at 303). If any system constraint exist, server 120 may continue identifying problematic electric vehicles based on the sensitivity coefficients (at 304), and adjusting recharging schedules for the identified electric vehicles based on the sensitivity coefficients (at 305), until an optimal solution is achieved (i.e., no more system constraint violations exist at the time step).

Particular embodiments may repeat the steps in FIG. 3, where appropriate. Moreover, although this disclosure describes and illustrates particular operations of the method of FIG. 3 as occurring in a particular order, this disclosure contemplates any suitable operations of the method of FIG. 3 occurring in any suitable order. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

In particular embodiments, server 120 may transmit messages to charging equipment 111; the messages may include optimal recharging schedules determined by the example method of FIG. 3, causing charging equipment 111 to recharge respectively connected electric vehicles accordingly.

Particular embodiments may optimize total demand of the power system further based on fairness among electric vehicle recharging customers. For example, assume that the charging load for a particular electric vehicle is reduced for time step t as at 305 of the example method of FIG. 3. Particular embodiments may compensate (or penalize less) the particular electric vehicle for the next time step t+1 to avoid service starvation for the particular electric vehicle.

Particular embodiments may generate a list of components of electricity distribution network 120 to be targeted for future upgrades by the utility company owning electricity distribution network 120. For example, based on the example method of FIG. 3, if a particular component operates within a pre-determined threshold (e.g., 95% or above) of its rated capability for a pre-determined number of incidences (e.g., 100 times), particular embodiments may include the particular component in the list of components for future upgrades. For example, based on the example method of FIG. 3, if a particular component causing a pre-determined number (e.g., 10) of electric vehicles to fail to charge fully based on respective customer recharging schedules, particular embodiments may include the particular component in the list of components for future upgrades.

Figure 4:
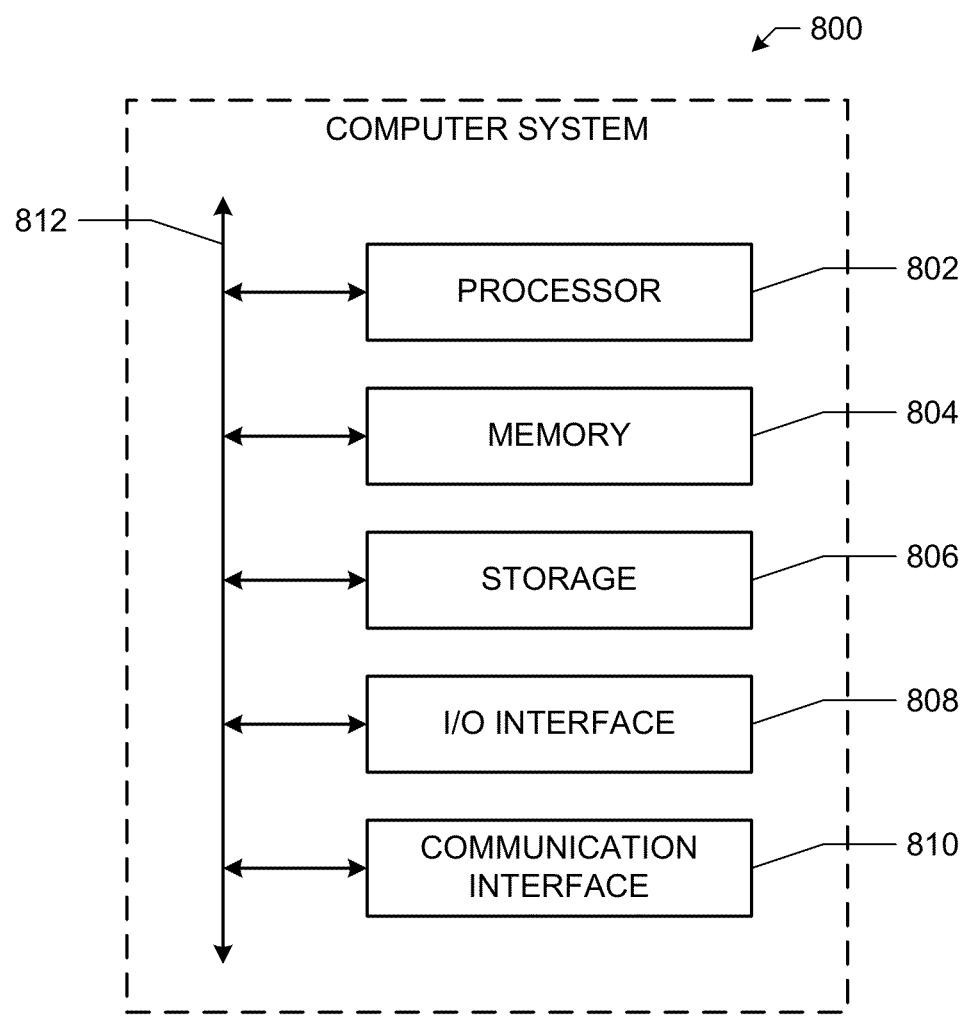
FIG. 4 illustrates an example computer system.

FIG. 4 illustrates an example computer system 800, which may be used with some embodiments of the present invention. This disclosure contemplates any suitable number of computer systems 800. This disclosure contemplates computer system 800 taking any suitable physical form. As example and not by way of limitation, computer system 800 may be an embedded computer system, a system-on-chip (SOC), a desktop computer system, a mobile computer system, a game console, a mainframe, a mesh of computer systems, a server, or a combination of two or more of these. Where appropriate, computer system 800 may include one or more computer systems 800; be unitary or distributed; span multiple locations; span multiple machines; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. In particular embodiments, memory 804 includes main memory for storing instructions for processor 802 to execute or data for processor 802 to operate on. As an example and not by way of limitation, computer system 800 may load instructions from storage 806 to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. One or more memory buses (which may each include an address bus and a data bus) may couple processor 802 to memory 804. Bus 812 may include one or more memory buses, as described below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM).

In particular embodiments, storage 806 includes mass storage for data or instructions. As an example and not by way of limitation, storage 806 may include an HDD, a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), or flash memory or a combination of two or more of these.

In particular embodiments, I/O interface 808 includes hardware, software, or both providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, microphone, display, touch screen, mouse, speaker, camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) for communicating with an Ethernet or other wire-based network or a wireless NIC (WNIC) for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (e.g., a BLUETOOTH WPAN), a WI-FI network (e.g., a 802.11a/b/g/n WI-FI network,), a WI-MAX network, a cellular network (e.g., a Global System for Mobile Communications (GSM) network, a Long Term Evolution (LTE) network), or other suitable wireless network or a combination of two or more of these.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an INFINIBAND interconnect, a low-pin-count (LPC) bus, a memory bus, a Peripheral Component Interconnect Express or PCI-Express bus, a serial advanced technology attachment (SATA) bus, a Inter-Integrated Circuit (I2C) bus, a Secure Digital (SD) memory interface, a Secure Digital Input Output (SDIO) interface, a Universal Serial Bus (USB) bus, a General Purpose Input/Output (GPIO) bus, or another suitable bus or a combination of two or more of these. Bus 812 may include one or more buses 812, where appropriate.

Herein, reference to a computer-readable non-transitory storage medium may include a semiconductor-based or other integrated circuit (IC) (such as, for example, a field-programmable gate array (FPGA) or an application-specific IC (ASIC)), a hard disk drive (HDD), a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, another suitable computer-readable non-transitory storage medium, or a suitable combination of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the invention and the concepts contributed by the inventor to furthering the art, and are to be construed as being without limitation to such specifically recited examples and conditions. Although the embodiment(s) of the present inventions have been described in detail, it should be understood that the various changes, substitutions, and alterations could be made hereto without departing from the spirit and scope of the invention.

What is claimed is:

1. A method, performed by one or more computing devices, comprising:
   receiving input information associated with an electricity distribution network;
   receiving information associated with one or more electric vehicles within the electricity distribution network;
   determining, for each of the one or more electric vehicles, a recharging schedule for a specified period of time, the recharging schedule being based on at least the input information; and
   for at least one unit of time during the specified period of time:
      adjusting the recharging schedule for at least one of the one or more electric vehicles based at least in part on a determination of one or more system constraint violations in the electricity distribution network caused by recharging the one or more electric vehicles; and
   wherein the determining comprises:
      receiving information associated with one or more customer recharging schedules, each customer recharging schedule being associated with one of the one or more electric vehicles; and
      optimizing a total demand of the electricity distribution network based on the one or more customer recharging schedules.

2. The method of claim 1, wherein the system constraint violations comprise violations in voltages or currents in nodes and components of the electricity distribution network.

3. The method of claim 1, further comprising generating a list of components of the electricity distribution network for future upgrade.

4. The method of claim 1, wherein the optimizing comprises: determining an L-2 norm of the total demand of the electricity distribution network based on the one or more customer recharging schedules.

5. The method of claim 1, wherein the optimizing is further based on fairness among one or more recharging electric vehicles.

6. The method of claim 1, wherein the adjusting comprises:
   determining system outputs of the electricity distribution network in response to recharging the one or more electric vehicles; and
   for at least one system constraint violation:
      determining sensitivity coefficients of the electricity distribution network in response to recharging the one or more electric vehicles;
      identifying one or more problematic electric vehicles of the one or more electric vehicles corresponding to the at least one system constraint violation based on sensitivity coefficients; and
      adjusting respective recharging schedules of the one or more problematic electric vehicles based at least in part on the corresponding sensitivity coefficients.

7. The method of claim 6, wherein the determining sensitivity coefficients comprises:
   determining first system outputs of the electricity distribution network based on a base demand profile;
   determining second system outputs of the electricity distribution network based on the base demand profile and additional demand from recharging the one or more electric vehicles; and
   calculating the sensitivity coefficients based on a ratio of a difference between the first and the second system outputs to the additional demand from recharging the one or more electric vehicles.

8. The method of claim 6, wherein the adjusting respective recharging schedules of the one or more problematic electric vehicles is also based on a severity of each corresponding system constraint violation.

9. A system comprising:
a memory comprising instructions executable by one or more processors; and
the one or more processors coupled to the memory and operable to execute the instructions, the instructions causing the one or more processors to perform:
receiving input information associated with an electricity distribution network;
receiving information associated with one or more electric vehicles within the electricity distribution network;
determining, for each of the one or more electric vehicles, a recharging schedule for a specified period of time, the recharging schedule being based on at least the input information; and
for at least one unit of time during the specified period of time:
adjusting the recharging schedule for at least one of the one or more electric vehicles based at least in part on a determination of one or more system constraint violations in the electricity distribution network caused by recharging the one or more electric vehicles; and
wherein the system constraint violations comprise violations in voltages or currents in nodes and components of the electricity distribution network.

10. The system of claim 9, wherein the instructions causing the one or more processors to perform:
generate a list of components of the electricity distribution network for future upgrade.

11. The system of claim 9, wherein the instructions causing the one or more processors to perform the determining of the recharging schedule comprise:
receiving information associated with one or more customer recharging schedules, each customer recharging schedule being associated with one of the one or more electric vehicles; and
optimizing a total demand of the electricity distribution network based on the one or more customer recharging schedules.

12. The system of claim 11, wherein the instructions causing the one or more processors to perform the optimizing comprise:
determining an L-2 norm of the total demand of the electricity distribution network based on the one or more customer recharging schedules.

13. The system of claim 11, wherein the optimizing a total demand of the electricity distribution network is further based on fairness among one or more recharging electric vehicles.

14. The system of claim 9, wherein the instructions causing the one or more processors to perform the adjusting comprise:
determining system outputs of the electricity distribution network in response to recharging the one or more electric vehicles; and
for at least one system constraint violation:
determining sensitivity coefficients of the electricity distribution network in response to recharging the one or more electric vehicles;
identifying one or more problematic electric vehicles of the one or more electric vehicles corresponding to the at least one system constraint violation based on sensitivity coefficients; and
adjusting respective recharging schedules of the one or more problematic electric vehicles based at least in part on the corresponding sensitivity coefficients.

15. The system of claim 14, wherein the instructions causing the one or more processors to perform the determining of the sensitivity coefficients comprise:
determining first system outputs of the electricity distribution network based on a base demand profile;
determining second system outputs of the electricity distribution network based on the base demand profile and additional demand from recharging the one or more electric vehicles; and
calculating the sensitivity coefficients based on a ratio of a difference between the first and the second system outputs to the additional demand from recharging the one or more electric vehicles.

16. The system of claim 14, wherein the adjusting is also based on a severity of each corresponding system constraint violation.

17. One or more processors operable to cause an electricity distribution system to:
receive input information associated with an electricity distribution network;
receive information associated with one or more electric vehicles within the electricity distribution network;
determine, for each of the one or more electric vehicles, a recharging schedule for a specified period of time, the recharging schedule being based on at least the input information; and
for at least one unit of time during the specified period of time:
adjust the recharging schedule for at least one of the one or more electric vehicles based at least in part on a determination of one or more system constraint violations in the electricity distribution network caused by recharging the one or more electric vehicles; and
transmit a message to a charging equipment for the at least one electric vehicle, causing the charging equipment to recharge the at least one electric vehicle to recharge based on the adjusted recharging schedule; and
wherein the system constraint violations comprise violations in voltages or currents in nodes and components of the electricity distribution network.

* * * * *